United States Patent [19]

Lynch

[11] Patent Number: 4,869,056
[45] Date of Patent: Sep. 26, 1989

[54] MOWER ATTACHMENT FOR A TRACTOR

[76] Inventor: Harold H. Lynch, R.R. 1, Grundy Center, Iowa 50638

[21] Appl. No.: 167,135

[22] Filed: Mar. 11, 1988

[51] Int. Cl.$^4$ ............................................. A01D 34/86
[52] U.S. Cl. ...................................... 56/15.2; 56/15.5; 172/98
[58] Field of Search ...................... 56/16.7, 16.2, 15.5, 56/10.1, 15.2; 172/98, 99

[56] References Cited

U.S. PATENT DOCUMENTS

| | | | |
|---|---|---|---|
| 3,248,864 | 5/1966 | Barth | 56/15.2 |
| 3,545,184 | 12/1970 | Liepoid et al. | 56/10.7 |
| 3,949,539 | 4/1976 | Cartner | 56/10.7 |
| 4,426,829 | 1/1984 | Johnson | 56/15.5 |
| 4,502,269 | 3/1985 | Carter | 56/10.7 |

Primary Examiner—John Weiss
Attorney, Agent, or Firm—Rudolph L. Lowell

[57] ABSTRACT

The invention provides a mower attachment for a lawn or garden tractor carried on the tractor for movement between transport and operating positions. An articulated boom structure is guidably supported for up and down pivotal movement to provide for a predetermined substantially horizontal low path of movement for a mower unit at the free end of the boom structure, and for utilization of the weight of the mower unit in extending the boom structure during pivotal movement thereof. Extension of the boom structure is yieldably resisted by a spring unit which also functions to provide a floating action of the mower unit in following the ground contour in a mowing operation.

15 Claims, 5 Drawing Sheets

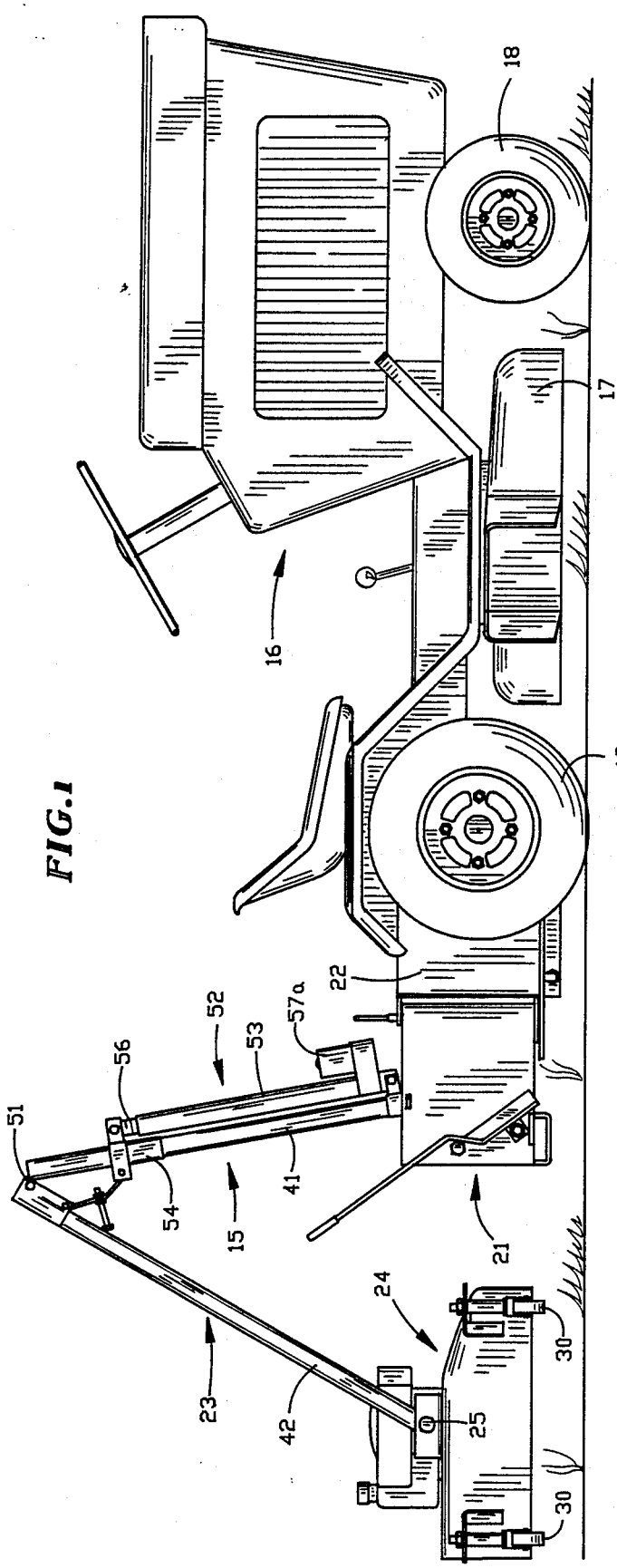
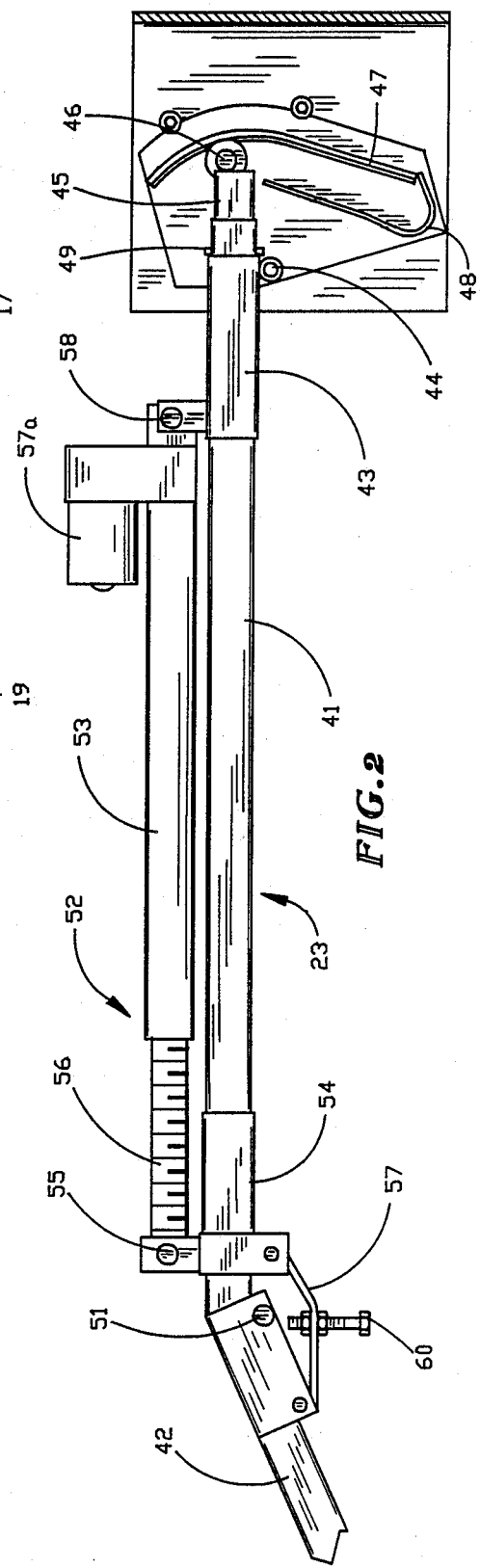
FIG.1
FIG.2

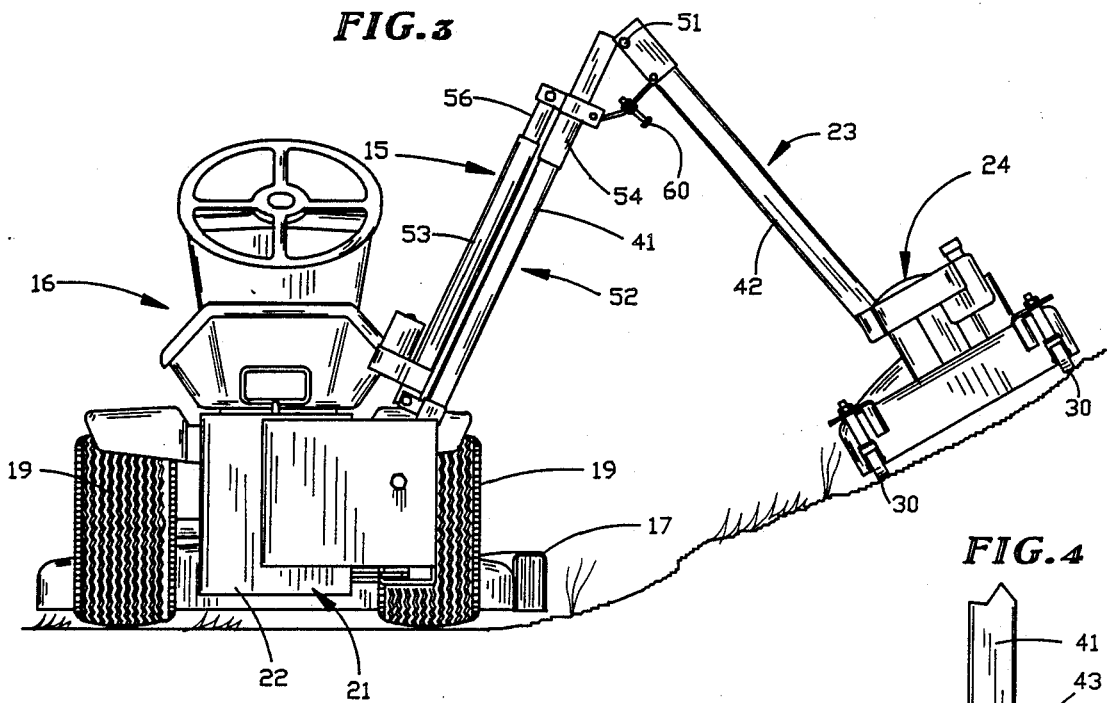
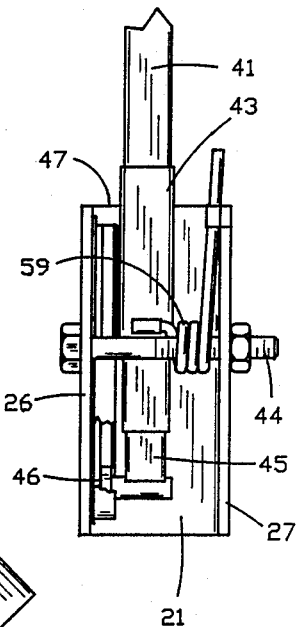
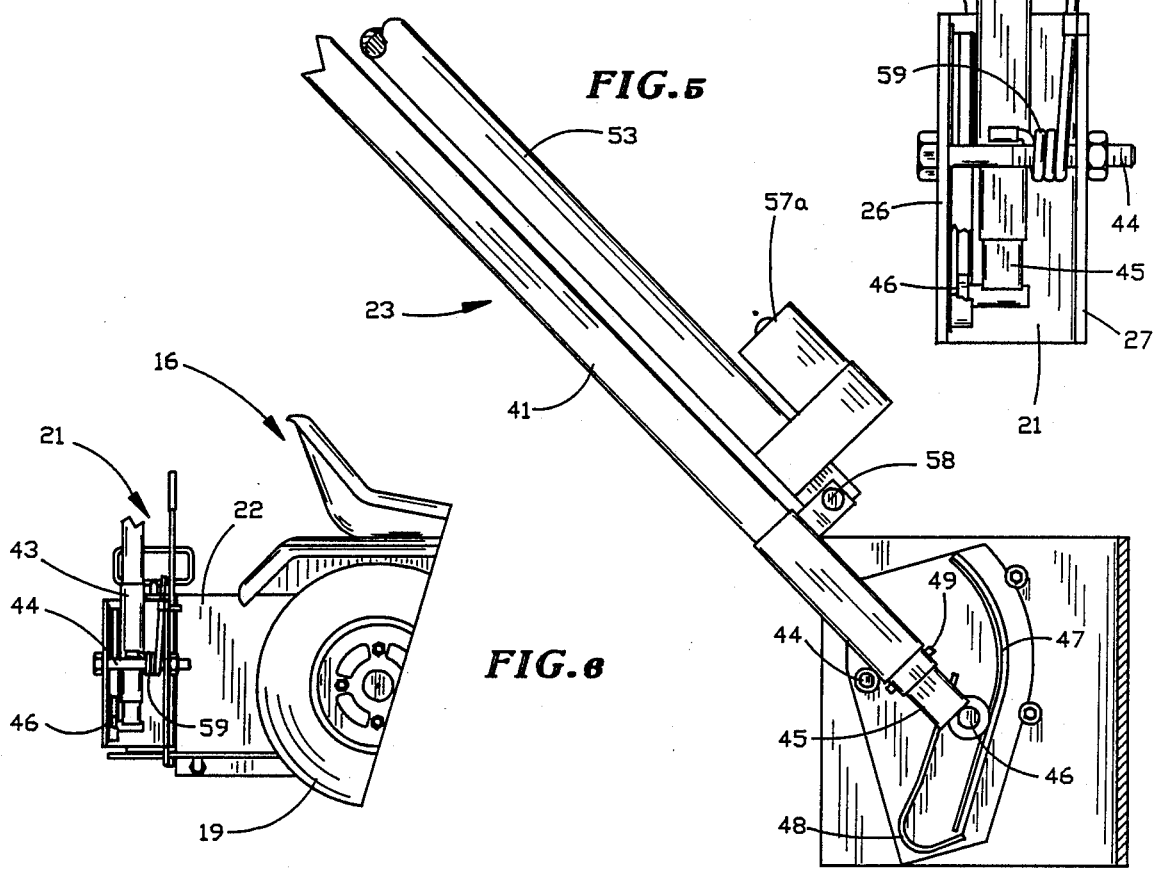

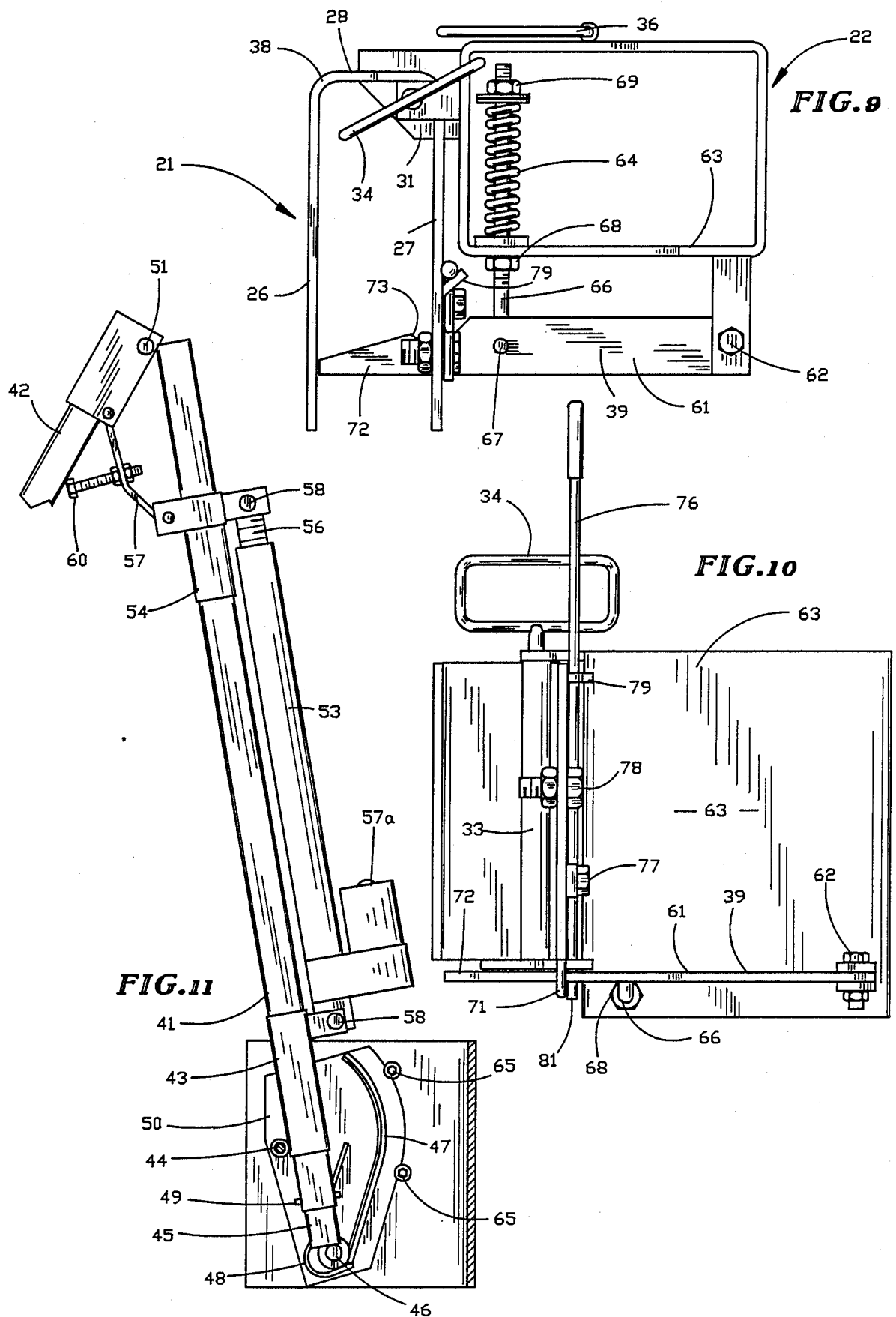

MOWER ATTACHMENT FOR A TRACTOR

This invention relates to mowing devices and, more particularly, to a mowing attachment for a self-propelled garden or lawn tractor.

BACKGROUND OF THE INVENTION

Mowing attachments having articulated booms are well known in the art. These mower attachments or units are used to facilitate cutting of grass, weeds and brush on shoulders, sidehills, berms, and the like at a position remote from the path of travel of the tractor on which the unit is carried. For example, U.S. Pat. No. 3,624,698 teaches a cutter or mower unit carried on an articulated arm for lateral and vertical movement relative to the tractor, as well as for pivotal movement about a vertical axis. The articulated arm is actuated by a plurality of hydraulic cylinders that are selectively operated to move the mower unit to a desired mowing position or transport position. The articulated boom assembly described in U.S. Pat. No. 4,502,269, is also moved by a plurality of hydraulic cylinders to adjust the position of the mower unit relative to the tractor.

The present invention provides an improved articulated boom which is actuated by a single linearly movable power unit and movable from a mowing position either manually, or as a result of striking an obstruction, to a transport position. The boom structure is movable to folded and unfolded positions therefor so as to retain the mower unit against being lifted substantially above the ground whereby to limit the risk of injury due to exposure of the mower unit cutting blades.

SUMMARY OF THE INVENTION

The invention is a mower attachment for a tractor that includes a two-section articulated boom movable between a folded upright position and an unfolded generally horizontal extended position. The boom is movably supported on the tractor for pivotal movement about a vertical pivot between a transport position located generally rearward of the tractor and a mowing position generally transverse of the tractor. A breakaway latch releasably holds the boom structure in the mowing position therefor.

A power unit movably mounted on the lower or base section of the boom structure is linearly extendible and retractible to unfold and fold, respectively, the articulated boom. During the extension and retraction of the power unit the movement of the base section is guidably controlled to decrease and increase, respectively, the angle of the base section, relative to the ground. The weight of a self-powered mower unit, floatingly attached to the free end of the boom, assists in moving the boom from the folded position to the unfolded position therefor in a coordinated manner providing for the movement of the mower unit toward and away from the tractor at a substantially uniform vertical distance above the ground.

BRIEF DESCRIPTION OF THE DRAWINGS

FIG. 1 is a side elevational view of a tractor and the mower attachment of this invention showing the boom structure for the attachment in the folded position therefor and the mower unit in the transport position therefor;

FIG. 2 is an enlarged, foreshortened side elevational view of the boom structure shown unfolded or fully extended and in a lowered position therefor;

FIG. 3 is a rear view of the tractor showing the boom structure of the mower attachment partially extended laterally from one side of the tractor to position the mower unit for mowing on a side hill;

FIG. 4 is an enlarged detail elevational view of the lower end of the boom structure with parts broken away to more clearly show a cam follower at the lower end of the boom structure and a cam plate on a base frame for the boom structure for controlling the pivotal and extendible movements thereof;

FIG. 5 is a foreshortened side view of the base section of the boom structure in a partially extended position showing the cam follower in an intermediate position on the cam plate;

FIG. 6 is a side elevational view of the rear portion of the tractor showing the mounting of the mower attachment thereon;

FIG. 9 is a top plan view of the assembly shown in FIG. 7, with the boom structure removed for the purpose of clarity;

FIG. 10 is a side elevational view of the assembly shown in FIG. 9;

FIG. 11 is a foreshortened side elevational view of the boom structure wherein the cam follower is shown adjacent a stop at the lower end of the cam plate to define the upright or folded position of the boom structure, with parts broken away for clarity;

DETAILED DESCRIPTION OF A PREFERRED EMBODIMENT

Figure 7:
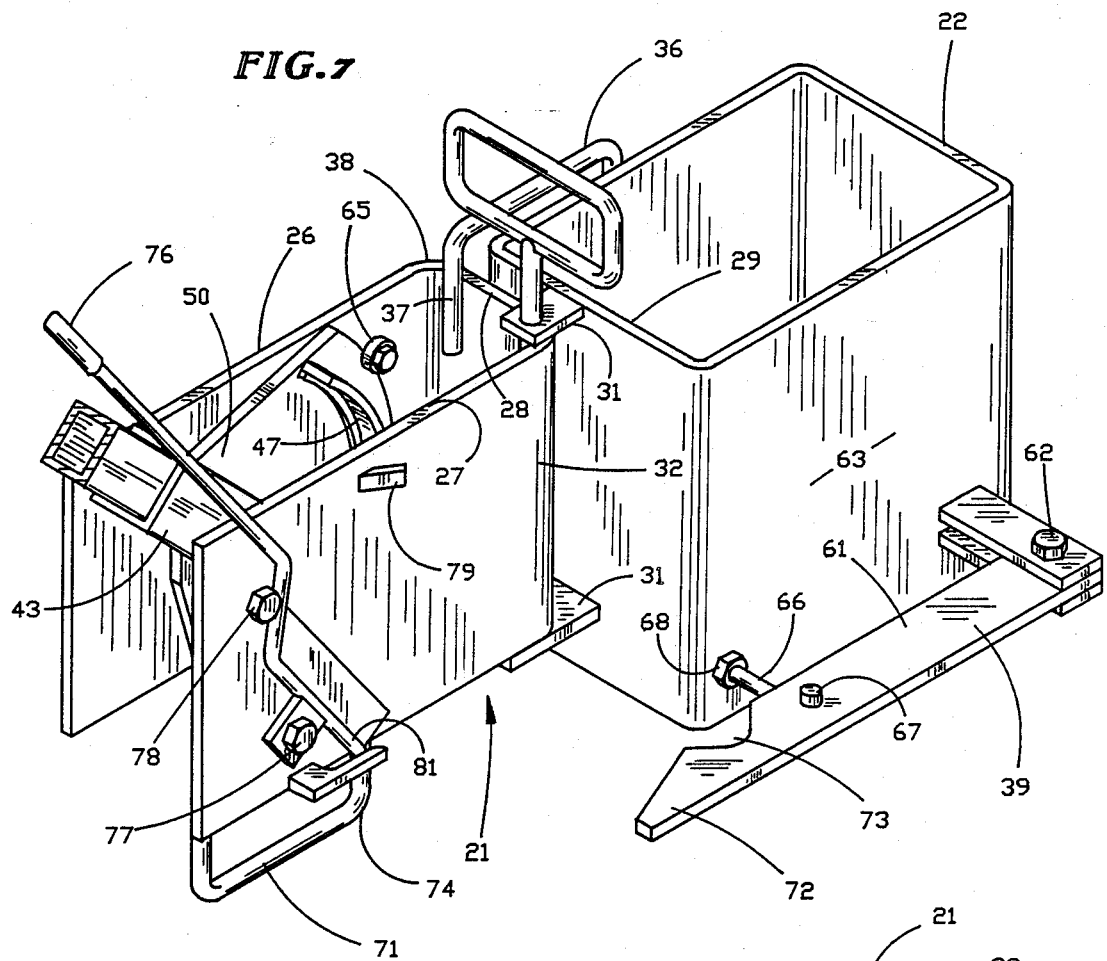
FIG. 7 is an enlarged detail perspective view showing the tractor mounting bracket for the mower attachment and the assembly thereof with the base frame of the mower attachment.

With reference to the drawings, the mower attachment of this invention, indicated generally at 15 in FIG. 1, is shown in assembly relation with a garden or lawn tractor 16 provided with a mower 17 secured to and suspended from the underside of the tractor frame for operation by the tractor engine. The mower 17 is positioned between the front and rear wheels 18 and 19, respectively, and is of a size to generally cut a swath which is slightly wider than the transverse dimension of the tractor.

The mower attachment 15 includes a base frame 21 that is pivotally supported on a mounting bracket 22 carried on and projected rearwardly from the rear portion of the tractor. The base frame is swingable about a vertical axis in a path transversely of the tractor to a first or transport position (FIG. 7) and to a second or operating position (FIG. 9). An articulated mower supporting boom structure 23, that forms part of the mowing attachment 15, is movably supported on the base frame 21 for guided movement to folded and unfolded positions therefor. A mower unit 24 is supported for a limited pivotal movement at the free end of the boom structure 23 about a pivot 25 extended transversely of the tractor when the mower attachment is in the operating position therefor. This limited movement permits casters 30 on the mower unit 24 to follow the contour of the ground during a mowing operation but retains the mower unit in a substantially horizontal position when the mower unit is out of contact with the ground.

The base frame 21 is of a generally U-shape in plan view (FIG. 7) having legs 26 and 27 and a connecting section 28. The mounting bracket 22 is of a generally rectangular shape in plan view having a front side attachable to the rear portion of the tractor 16 and a rear side 29 equipped with a pair of rearwardly projected vertically spaced tabs 31 arranged in a straddling relation with a corner 32 of the base frame. A pin receiving tube 33 (FIG. 10) within the corner 32 is axially alignable with holes (not shown) and the tabs 31 to receive a pin 34 therethrough. The base frame 21 is thus pivotally movable to a transport position extended longitudinally of the mounting bracket 22 (FIG. 7) wherein its open end faces rearwardly, and to a second operating position (FIG. 9) extended transversely of the mounting bracket and in turn of the tractor 16.

The base frame 21 is held in its transport position against swinging movement by a latch 36 movably supported for vertical movement on the mounting bracket 22 and having a hooked end 37 (FIG. 7) that is movable into and out of hooked engagement with the corner 38 of the base section on vertical movement of the latch. On a release of the latch 36, the base frame 21 is movable to the operating position therefor and releasably held therein by a latch mechanism 39 to be later described.

Figure 8:
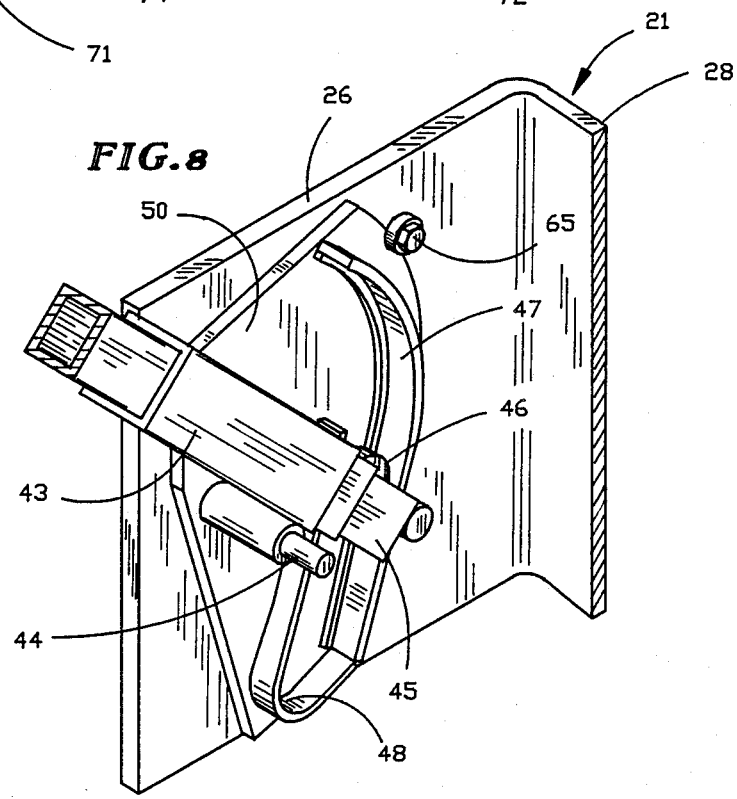
FIG. 8 is an enlarged detail perspective view showing the relative positions of the cam follower and cam plate when the base section of the boom structure is in the position therefor illustrated in FIG. 7, with parts broken away for clarity.

The boom structure 23 (FIGS. 1 and 2) is of a square tubular construction and includes a lower or base section 41 and an upper or extendible section 42. The bottom end of the lower section 41 is slidably supported within and extends through a sleeve member 43. The sleeve member 43 is pivotally supported on a pin 44 (FIGS. 2 and 8) carried on and extended between the leg members 26 and 27 of the base frame 21.

Inserted within the lower end of the boom base section 41 (FIGS. 8 and 11) is an extension member 45, the free end of which rotatably carries a cam follower 46 that is ridable in a cam track 47 adjustably secured to the inner side of the leg 26 of the base frame 21 and formed with a bottom loop 48 to define a stop limit for downward travel of the cam follower 46. The extension member 45 is connected to the lower boom section 41 by a connecting pin 49. On removal of the pin 49 the lower section 41 is removable from the sleeve member 43 to in turn permit removal of the boom structure 23 from the supporting base frame 21. It will also be noted that upward movement of the lower boom section 41 is limited by engagement of the pin 49 with the lower end of the sleeve member 43. As thus far described, it is seen that the movement of the lower boom section 41, from the upright position therefor shown in FIG. 11 to the horizontal position therefor shown in FIG. 2, occurs by a pivotal movement thereof about the pivot pin 44 concurrently with a linear movement thereof transversely of the pivot pin 44 by virtue of the travel of the cam roller 46 within the cam track 47.

The upper boom section 42 (FIGS. 1 and 2) is pivotally connected at 51 to the upper end of the base section 41. An actuating mechanism, designated generally as 52, includes a linearly movable power unit 53 and an actuating member 54 supported for slidable movement linearly of and along the upper end of the base section 41. The power unit 53 is of an available commercial type having a linearly extendible and retractible screw 56 driven from an electric motor 57a that is connectible to a battery electrical source (not shown) on the tractor 16. The actuating member 54 is interconnected with the boom upper section 42 by a pivoted link or lever 57 and to the screw 56 by a pivot 55. The lower end of the power unit 53 is connected at 58 to the sleeve member 43.

On extension of the screw 56, from its retracted position in FIG. 1, the actuating member 54 is moved upwardly on the boom base section 41 and through the link 57 pivotally moves and extends the upper boom section 42 relative to the boom section 41. Concurrently with this extension of the upper boom section 42 the boom structure 23 is pivoted downwardly in response to the weight of the mower unit 24 suspended from the free end of the upper boom section 42. This pivotal movement of the boom by the overhanging weight of the mower unit 24 takes place due to the lower boom section 41 being limited in its upward movement to an upright position inclined from the vertical in a direction toward the mower unit. This upright inclined position is defined by the reception of the cam roller 46 within the roller stop section 48 at the bottom of the cam track 47. The weight of the mower unit acting to pivotally lower the boom base section 41 is yieldably resisted by a torsion spring 59 (FIG. 4) mounted on the pivot pin 44 and held under pressure between the sleeve member 43 and the latch 30 on the leg 27 of the base frame 21. The spring 59 also provides for a floating support of the member unit 24 as it follows the surface of the ground during a mowing operation.

With reference to FIGS. 1 and 11, the boom structure 23 is shown in its folded position wherein the cam follower 46 is within the loop 48 at the bottom of the cam track 47. The overhang of the mower unit 24 at a position to initiate the unfolding action of the boom structure is obtained by the adjustment of a stop screw 60 carried in the link 57 for abutting engagement with the upper section 42 of the boom structure. In other words, with the lower boom section 41 in its stop position at the cam track end 48, the setting of the screw 60 determines the retracted or folded position of the section 42 relative to the section 41 and in turn the overhang relation of the mower unit 24 relative to the boom structure pivot 44.

In the operation of the mower attachment, the actuating mechanism 52, by virtue of its assembly relation with the boom structure 23, actuates the boom to perform two separate and distinct functions. As to the first of these functions, assume the stop screw 60 to be out of engagement with the extensible or upper boom section 42 (FIGS. 2 and 3). Under this condition, the power unit 53 operates to reciprocally move the actuating member 54 linearly on the lower boom section 41 to, in turn, increase or decrease the angle between the upper or extensible section 42 and the lower boom section 41. This results in the movement of the mower unit 24 toward and away from the tractor 16. It will be additionally noted that when the screw 60 is out of engagement with the upper boom section 42 that the cam roller 46 is permitted to freely follow the cam track 47 and the boom structure 23 to freely float against the action of the torsion spring 59 to acccommodate the following movement of the mower unit on ground irregularities.

With respect to the second function of the actuating mechanism 52, in its operation of the boom structure 23, assume that the screw 60 is in engagement with the upper section 42 (FIG. 11). Under this condition, the downward linear movement of the power unit screw 56 is transmitted from the actuating member 54 to the link 57 and pivot connection 51 to the lower boom section 41 so that the lower section is moved downwardly through the sleeve member 43. Stated otherwise, the actuating member 54 and the lower boom section 41 are movable downwardly as a unit assembly. This unit movement results in the extension of the boom section 41 from the lower end of the sleeve member 43 and the movement of the cam roller 46 downwardly of the cam track 47 resulting in the mower unit 24 being lifted above the ground to its rest or transport position.

Figure 13:
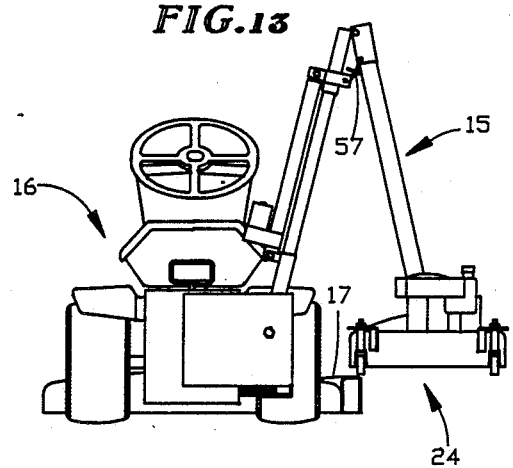
FIG. 13 illustrates diagrammatically the boom structure in its upright folded position located to one side of the tractor.
Figure 14:
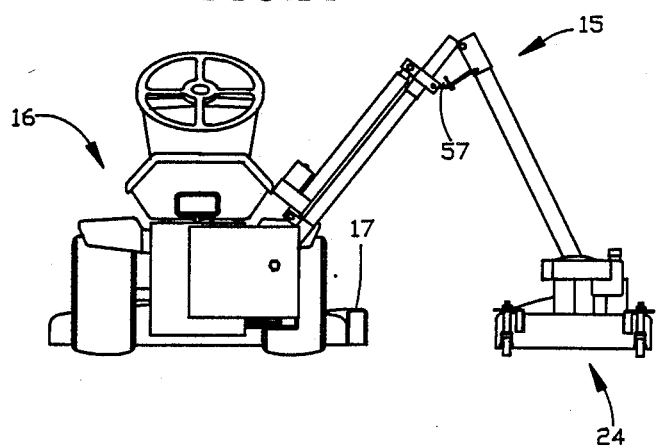
FIG. 14 is illustrated similar to FIG. 13 and shows the boom structure in a partially extended position.
Figure 15:
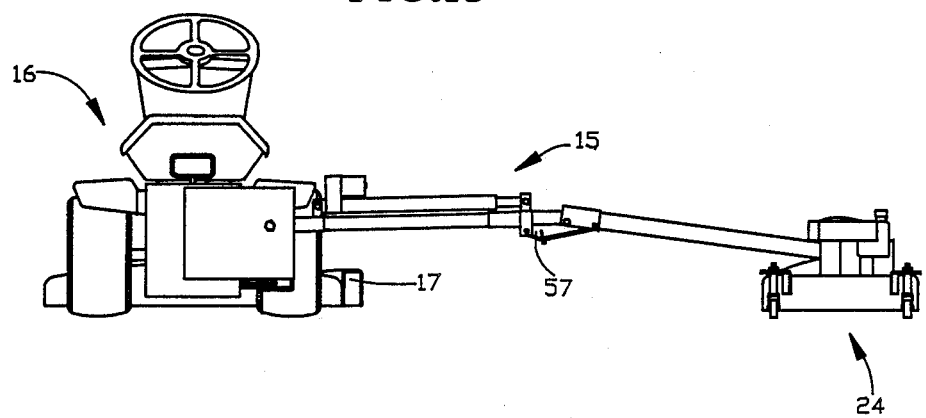
FIG. 15 is illustrated similar to FIG. 14 and shows the boom structure fully extended in a substantially horizontal position.

On extension of the power unit screw 56 from its retracted position, the boom structure 23 is yieldably extended against the action of the torsion spring 59 from its folded position in FIGS. 1 and 13 to the intermediate position therefor shown in FIGS. 5 and 15 and finally to the fully extended or unfolded position therefor shown in FIGS. 2 and 15. This unfolding movement of the boom structure proceeds under the guided action of the cam track 47 so that at all moved positions of the boom structure the mower unit 24 is maintained adjacent the ground to reduce exposure of the cutting blades at the under side of the mower unit.

Figure 12:
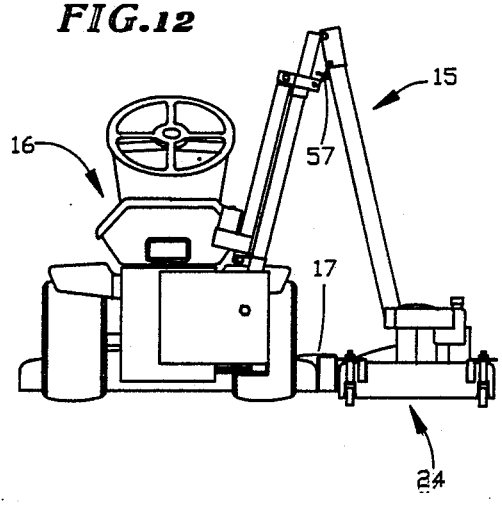
FIG. 12 is a diagrammatic illustration showing the mower attachment in a position for increasing the mowing swath of the tractor mower.

As previously mentioned, the mower 17 on the tractor cuts a swath slightly wider than the transverse dimension of the tractor. This swath may be increased by the cutting width of the mower unit 24 by operation of the power unit 53 to position the mower unit 24 to one side of the tractor mower 17 as illustrated in FIG. 12. In this respect, it will be understood that the under tractor mower 17 on commercially available garden tractors will vary in the width of their cutting swaths and vertical mounting on the tractor. To accommodate such variations, the cam track 47 is adjustably mounted on the base frame 21 to vary the vertical position of the mower unit 24 relative to the tractor mower 17.

The cam track 47 is carried on a plate member 50 (FIGS. 7 and 8) which is mounted on the pivot 44 at a position against the inner surface of the leg member 26 of the base frame 21. Adjusting screws 65 (FIG. 11) threadable in the leg member 26 hold the cam plate 47 in an adjusted position relative to the pivot 44. This adjustment provides for an angular displacement of the cam plate relative to the screws 65 on the order of about one eighth to one quarter of an inch.

In preparing the mower attachment 15 for use on a tractor 16 the screw 60 is adjusted to for the angular relation of the boom sections 41 and 42 in the folded position of the boom structure 23. The cam track 47 is then adjusted so that when the boom structure 23 is being moved from an extended position to a folded position therefor the initial engagement of the screw 60 with the boom section 42 will initiate a lifting of the mower unit 24 from its ground supported position. Following this initial engagement of the screw 60 and boom section 42 the actuating mechanism 52 performs its previously described second function, namely, lifting the mower unit 24 to its rest or transport position.

In the use of the mower attachment 15, the base frame 21 is in the releasably locked position thereof illustrated in FIGS. 6, 9 and 10 to provide for the extension of the boom structure 25 laterally from one side of the tractor 16. The releasable latching mechanism 39 includes a latch member 61 pivoted at 62 to the mounting bracket sidewall 63. The latch 61 is yieldably maintained in the latching position therefor by a coil spring 64 located in the mounting bracket 22 and carried about a rod 66 slidably extended through the sidewall 63 for connection at 67 with the latch 61. The spring 64 is arranged in compression between an adjusting nut 68 positioned on the rod 66 to the outside of the wall 63 and a nut 69 at the inner end of the rod 66.

In its latching position, the latch member 39 is moved into locking engagement with a keeper member 71 secured to and projected downwardly from the leg member 27 of the base frame 21 (FIGS. 7 and 10). As shown in FIG. 7, the keeper member 71 is of a rod construction and of a generally U-shape to form with the bottom edge of the leg member 26 of the base frame 21 an opening for reception of the latch member end portion 72. A cam notch 73 formed in one side of the end portion 72 is engageable with the keeper end 74.

By virtue of this construction, should the boom structure 23, during a mowing operation, strike an obstruction, the keeper end 74 functions as a cam follower with respect to the cam notch 73 acting to overcome the locking pressure applied on the latch member 39 by the spring 64 and moving the lever 61 free of the keeper end 74. The base frame is thus released for movement from the position thereof in FIGS. 9 and 10 to its position shown in FIG. 7, it being understood that the latch 36 is out of engagement with the base frame 21 during mower operation.

To release the latch mechanism 39, on completion of a mowing operation and for transport of the mower attachment 15, there is provided a release lever 76 (FIGS. 7 and 10). The lever 76 is pivoted at 77 for pivotal movement to the outside of the base frame leg member 27 to a rest position out of engagement with latch member 61 defined by a stop abutment 78 on the leg member 27. On pivotal movement of the release lever 76 from the rest position therefor to a latch release position against a stop 79 on the leg member 27, the lower end 81 of the lever engages the latch end portion 72 and moves the latch free of the keeper end 74. When thus released, the base frame 21 is manually pivoted about the pivot pin 34 to its transport position in FIG. 1 and maintenance in such position by the latch 36.

Although the invention has been described with respect to a preferred embodiment thereof it is to be understood that it is not to be so limited since changes and modifications can be made therein within the full intended scope of this invention as defined by the appended claims.

I claim:
1. A mowing attachment for a tractor, including:
(a) a boom structure comprising a lower section and an upper extendible section having a mower unit mounted thereon,
(b) means movably connecting adjacent ends of said lower section and extendible section for movement of said extendible section to a first folded upright position and to a second horizontally unfolded position relative to said lower section,
(c) a base frame mountable on a tractor,

(d) means supporting said lower section on said base frame for a guided pivotal movement of the boom structure about a horizontal axis extended longitudinally of the tractor concurrently with movement of the boom structure transversely of said axis, (e) power means mounted on said lower section, and (f) means connecting said power means with said extendible section and with the means supporting said lower section to move the extendible section to said folded position and unfolded position therefor concurrently with pivotal movement of said boom structure.

2. The mowing attachment according to claim 1 wherein:

(a) said power means includes a linearly movable operating member, and (b) said connecting means includes an actuating member movably supported on said lower section for movement longitudinally thereof and a link member pivotally interconnecting said actuating member and said extensible section.

3. The mowing attachment according to claim 2 including:

(a) a stop member adjustably mounted on said link member and engageable with said extendible section to define the folded position therefor, (b) said boom structure, in the folded position of said extendible section, being movable downwardly by said power means transversely of said horizontal axis concurrently with an upward pivotal movement about said axis to an elevated position wherein the mowing unit is in a clearance relation with the ground, and (c) said extendible section, when said stop member is out of engagement therewith, in response to the movement of said actuating member longitudinally of said lower section being movable relative to said lower section to increase or decrease the angle therebetween concurrently with a free pivotal movement of the boom structure about said horizontal axis.

4. A mowing attachment for a tractor, including:

(a) a boom structure having a lower section and an extendible mower unit carrying section movable to a first folded position and to a second unfolded position relative to said lower section, (b) a base frame attachable to said tractor, (c) means movably supporting said lower section on said base frame for yieldable pivotal movement about a horizontal axis extended longitudinally of said tractor and for a linear movement transversely of said horizontal axis, (d) actuating means for said extendible section mounted on said lower section for linear movement transversely of said horizontal axis, and (e) a linearly movable power means connected to said actuating means supporting said lower section and supporting means.

5. The mowing attachment according to claim 4, wherein:

(a) said means supporting lower section includes a sleeve member for guidably receiving said lower section and a pivot member for pivotally supporting said sleeve member on said base frame.

6. The mowing attachment according to claim 4, including:

(a) coacting means on said lower section and base frame for guidably controlling the linear movement of said lower section transversely of said horizontal axis.

7. The mowing attachment according to claim 4, including:

(a) means supporting said base frame on the tractor for movement of said horizontal axis to a first position extended longitudinally of said tractor and to a second position extended transversely of said tractor, and (b) means for releasably securing said base frame in the first position therefor.

8. The mowing attachment according to claim 6 wherein:

(a) said coacting means includes a cam track on said base frame and a cam follower adjacent the bottom end of said lower section.

9. The mowing attachment according to claim 8, including:

(a) means on said cam track for limiting the upward pivotal movement of said lower section to a stop position defining the folded position of said boom structure.

10. The mowing attachment according to claim 8, including:

(a) means movably supporting a mower unit at the free end of said extendible section for limited pivotal movement about an axis extended transversely of the tractor when said horizontal axis is extended longitudinally of the tractor, and (b) said coacting means maintaining the mower unit at a selected substantially uniform vertically spaced position above the ground during movement of the boom structure between unfolded and folded positions therefor.

11. The mowing attachment according to claim 10, including:

(a) means for yieldably resisting the downward movement of the boom structure to the unfolded position therefor to counteract the weight of the mower unit on said extendible section.

12. The mowing attachment according to claim 7 wherein:

(a) said means supporting the base frame includes a mounting bracket for attachment to the rear end portion of the tractor, and (b) means pivotally supporting said base frame on said mounting bracket for pivotal movement about a vertical axis to said first and second positions therefor.

13. A mower attachment for a tractor including:

(a) an articulated boom structure having a lower section and an upper section, (b) means movably supporting said lower section on said tractor for up and down pivotal movement about a horizontal axis concurrently with linear transverse movement relative to said axis, and (c) means for moving said upper section to a first extended position and to a second folded position relative to said lower section in response to said linear movement of the lower section.

14. The mower attachment according to claim 13 including (a) a mower unit mounted at the free end of said upper section, (b) means yieldably resisting the downward pivotal movement of said lower section to counteract the weight of said mower unit, and (c) coacting means on the means supporting said lower section on said lower section for limiting the upward pivotal movement of the lower section to a position wherein the weight of the mower unit tends to pivot the lower section downwardly.

15. The mower attachment according to claim 13 wherein:
(a) said moving means includes an actuating mechanism having an actuator member guidably supported on said lower section for movement longitudinally thereof, and a link member pivotally interconnecting said actuator member and upper section.

* * * * *